April 30, 1968 K. STEMMLER 3,380,327
CUTTING DEVICE FOR CUTTING WEBS AND BLANKS
Filed Jan. 13, 1966 4 Sheets-Sheet 3
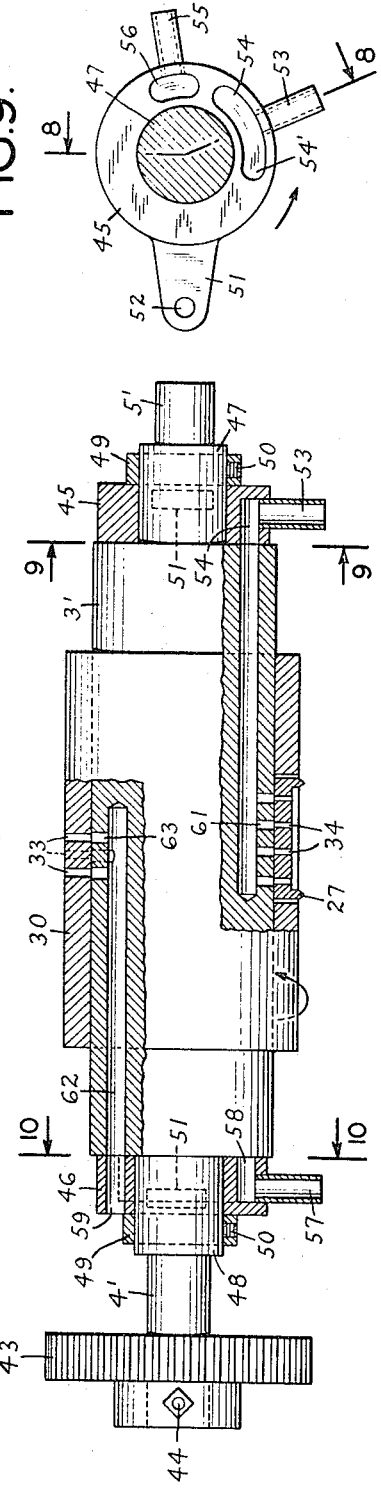
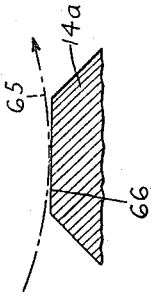
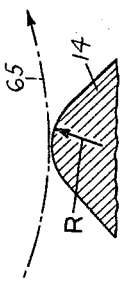
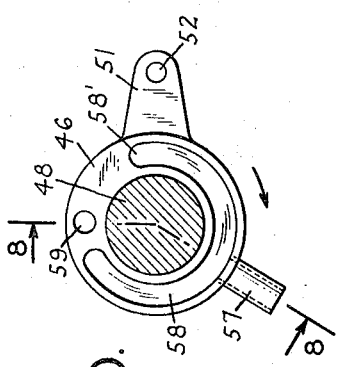

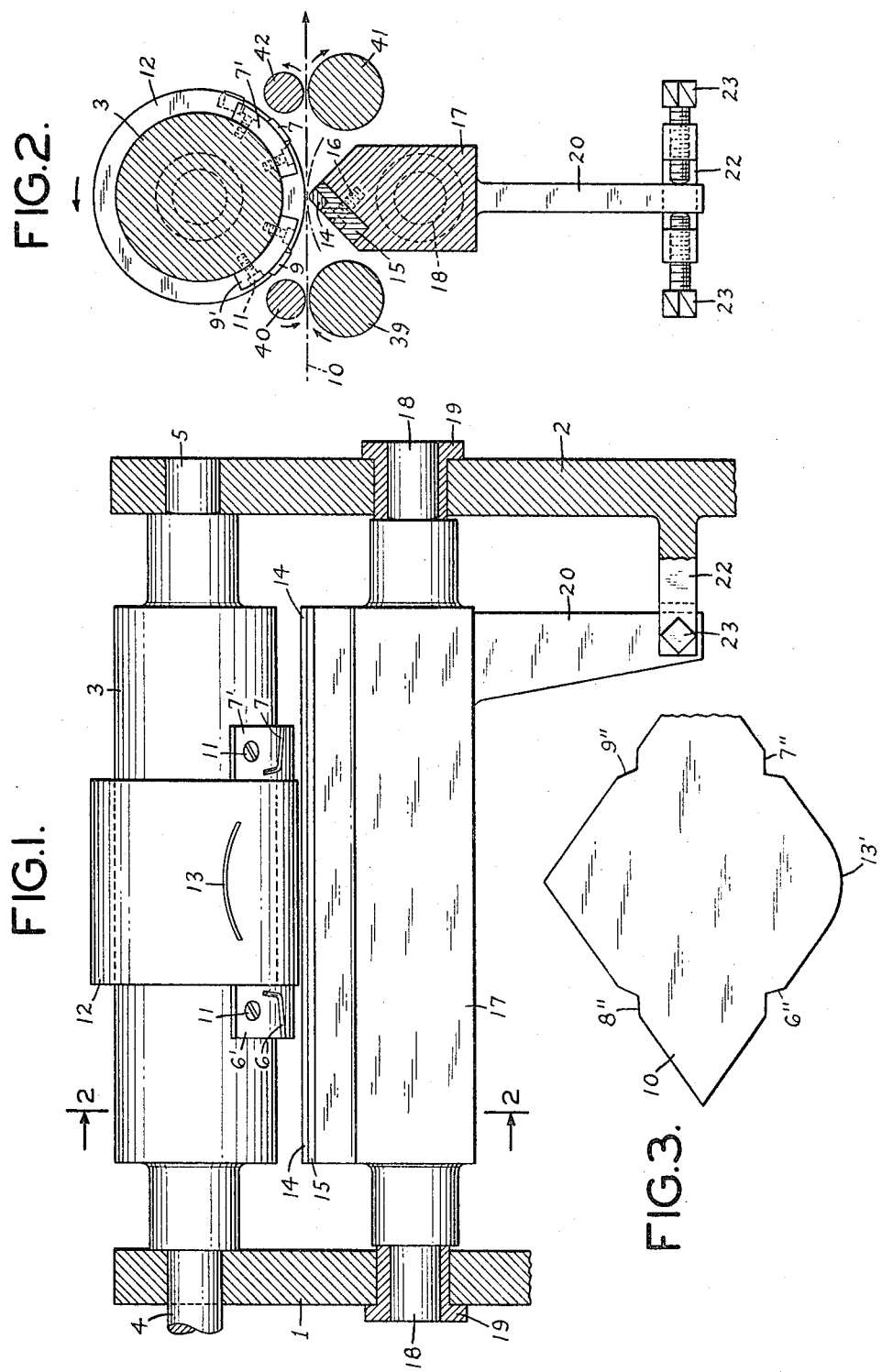

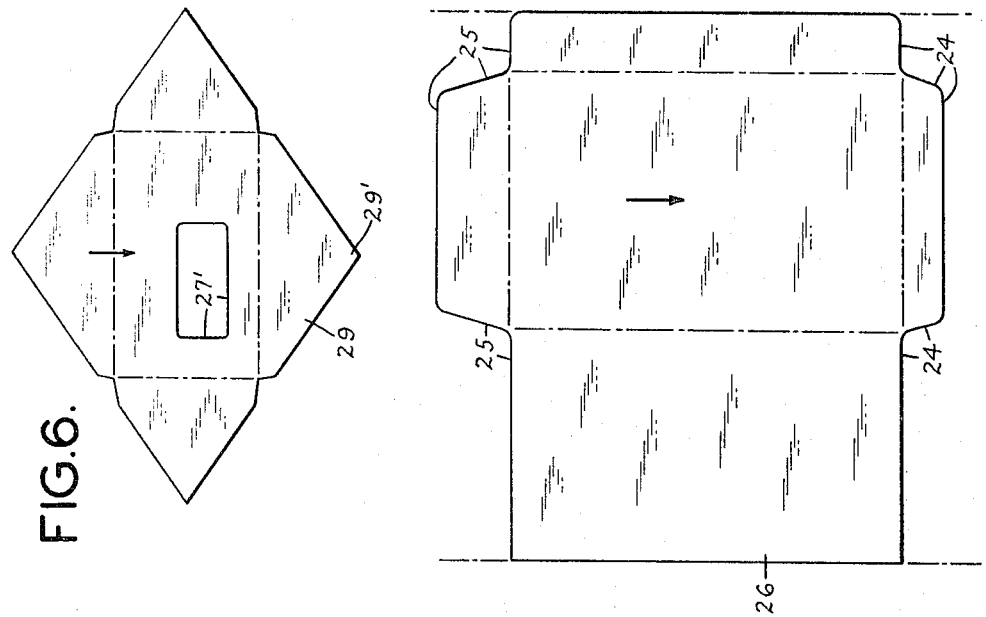
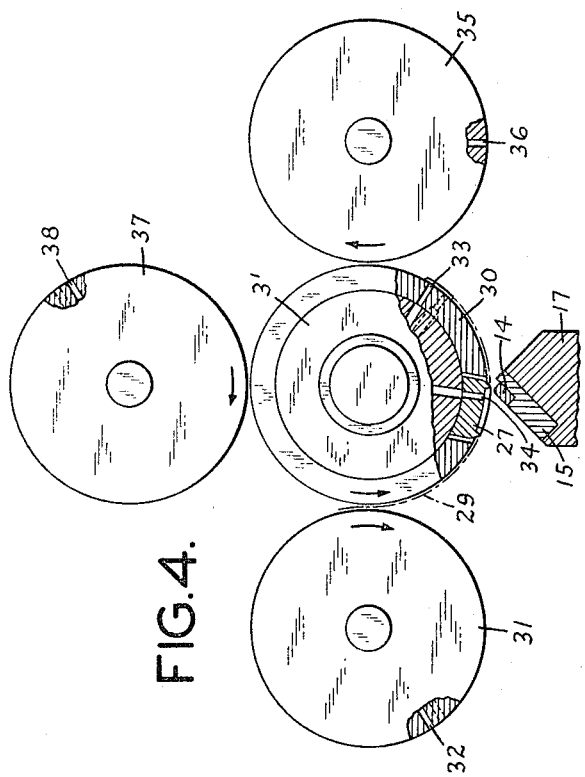

April 30, 1968     K. STEMMLER     3,380,327
CUTTING DEVICE FOR CUTTING WEBS AND BLANKS
Filed Jan. 13, 1966     4 Sheets-Sheet 4

United States Patent Office 3,380,327
Patented Apr. 30, 1968

3,380,327
CUTTING DEVICE FOR CUTTING
WEBS AND BLANKS
Kurt Stemmler, Irlich, near Neuwied Birkenweg, Germany, assignor to Richard Winkler, Rengsdorf ober Neuwied, and Kurt Dunnebier, Gladbach am Birkenhang, Germany
Continuation-in-part of application Ser. No. 361,607, Apr. 14, 1964. This application Jan. 13, 1966, Ser. No. 520,422
Claims priority, application Germany, Dec. 23, 1963, W 35,866
5 Claims. (Cl. 83—100)

This is a continuation-in-part of application Ser. No. 361,607, filed on Apr. 14, 1964 and now abandoned by the present applicant.

The present invention relates to a trimmer or cutter for cutting webs and blanks made of paper or similar sheet material such as blanks for envelopes, and more particularly to devices for cutting such webs and blanks between rapidly rotating cutters and a coacting counter surface to provide profile cuts therein.

The term "profile" as used herein in relation to cuts or cut-outs produced in a web or blank advanced through the machine is to be understood as meaning that the cuts produced have portions which extend at a substantial angular relation to each other, such as lengthwise and crosswise of the direction of advance, as distinguished from a substantially straight line cut that may be produced in the web or blank.

It is known and in wide use in the manufacture of envelopes for letters and larger papers to cut windows, corners, rounded bottom, side and top flaps in blanks or webs while the blanks or webs are guided between two rotary rollers. One of the rollers has suitably shaped knife blades protruding from its outer peripheral surface and the other has a hard and smooth cylindrical peripheral surface. The two rollers are in direct peripheral contact or so closely spaced that the material is cut between the cutting roller and the counter roller, or more accurately squeezed off.

It has been found that with cutting machines of this kind the cutting action of the cutting roller is improved when the diameter of the counter roller is less than that of the cuting roller. However, there are rather narrow practical limits to the reduction of the diameter of the counter roller due to the danger of sagging and vibrating of the counter roller.

It has also been found that a reduced rate of revolution of the counter roller in reference to the rate of revolution of the cutting roller has a favorable effect upon the cutting action due to the resulting sliding of the cutting blades on the counter roller. Again the practical limits for such differential rates of revolution are rather narrow.

On the basis of the aforementioned considerations and observations, applicant has found that the most favorable cutting conditions are obtained when the circumferential speed of the counter surface for the cutting roller is at a minimum, preferably zero, and the active area of the counter surface is also at a minimum.

It is a broad object of the invention to provide a novel and improved profile cutter of the general type above referred to in which the counter surface has a circumferential speed of zero, i.e., is held completely stationary, and a minute area such as a few square millimeters. Extensive tests have shown that extremely sharp and clean cut edges on the paper are obtained with the cutter according to the invention and that the useful life of the knives of the cutter coacting with a counter surface according to the invention is considerably longer than that of knives coacting with a conventional rotary counter roller.

A more specific object of the inventoin is to provide a novel and improved cutter in which the conventional rotary counter roller is replaced by a stationary, polished counter surface occupying a minute area, the position of which can be adjusted in reference to the rotary cutting roller so that optimal conditions for the cutting operation can be conveniently set and maintained.

Another more specific object of the invention is to provide a novel and improved cutter in which adjustment of the stationary counter surface can be effected during operation and in which a line on the counter surface that is closest to the path of the cutting edges on the rotary roller while being adjusted moves along a circular path, whereby the distance between the cutting edges and said line on the counter surface at the time they are nearest to each other can be controlled with great accuracy.

Still another object is to provide a counter member having a hard flat surface which can be positioned parallel with the path of movement of the sheet material between the cutting roller and the counter member, and can be accurately adjusted to be positioned at a selected small angle either toward or away from said path of movement.

A further, more specific object of the invention is to provide a novel and improved cutter which is self-dressing in that a practically perfect cylindrical path of the cutting edges, i.e. all points of the cutting edges are at the same radial distance from the axis of rotation of the cutting roller, is continuously and automatically maintained by the coaction of the rotating cutting edges with a stationary, hard and highly polished counter surface, upon adjustment of the counter surface in the manner herein described. Experience shows that a rotary cutting roller, even if initially constructed to provide such a practically perfect cylindrical path for the cutting edges, deteriorates gradually so that the cutting edges depart substantially from said cylindrical path. When such cutting roller coacts with a rotary counter roller, as it is conventional, and the counter roller is reset into direct contact with the cutting edges of the cutters or tools, these tools, depending upon their hardness, will become deformed or chipped. On the other hand, the hard, polished stationary counter surface of the invention continuously dresses the cutting tools so that their cutting edges continue to follow their cylindrical path.

Other and further objects, features and advantages of the invention will be pointed out hereinfater and set forth in the appended claims constituting part of the application.

In the accompanying drawings several preferred embodiments of the invention are shown by way of illustration and not by way of limitation.

In the drawings:

FIG. 1 is a view partly in elevation and partly in section, of a cutting device according to the invention;

FIG. 2 is a section taken on line II—II of FIG. 1;

FIG. 3 is a plan view of the major portion of a blank for an envelope cut with the device according to FIGS. 1 and 2;

FIG. 4 is a fragmentary elevational view, partly in section, of a modification of the cutting device;

FIG. 5 shows structural details of portions of the device according to FIG. 4, approximately at natural size;

FIG. 6 is a plan view of a blank for an envelope cut with the device according to FIG. 4;

FIG. 7 is a plan view of a blank for a flat bag cut with a cutting device according to the invention;

FIG. 8 is a view, partly in section along the lines 8—8 of FIGS. 9 and 10, of the cutting roller of the cutting device according to FIG. 4;

Figure 13:
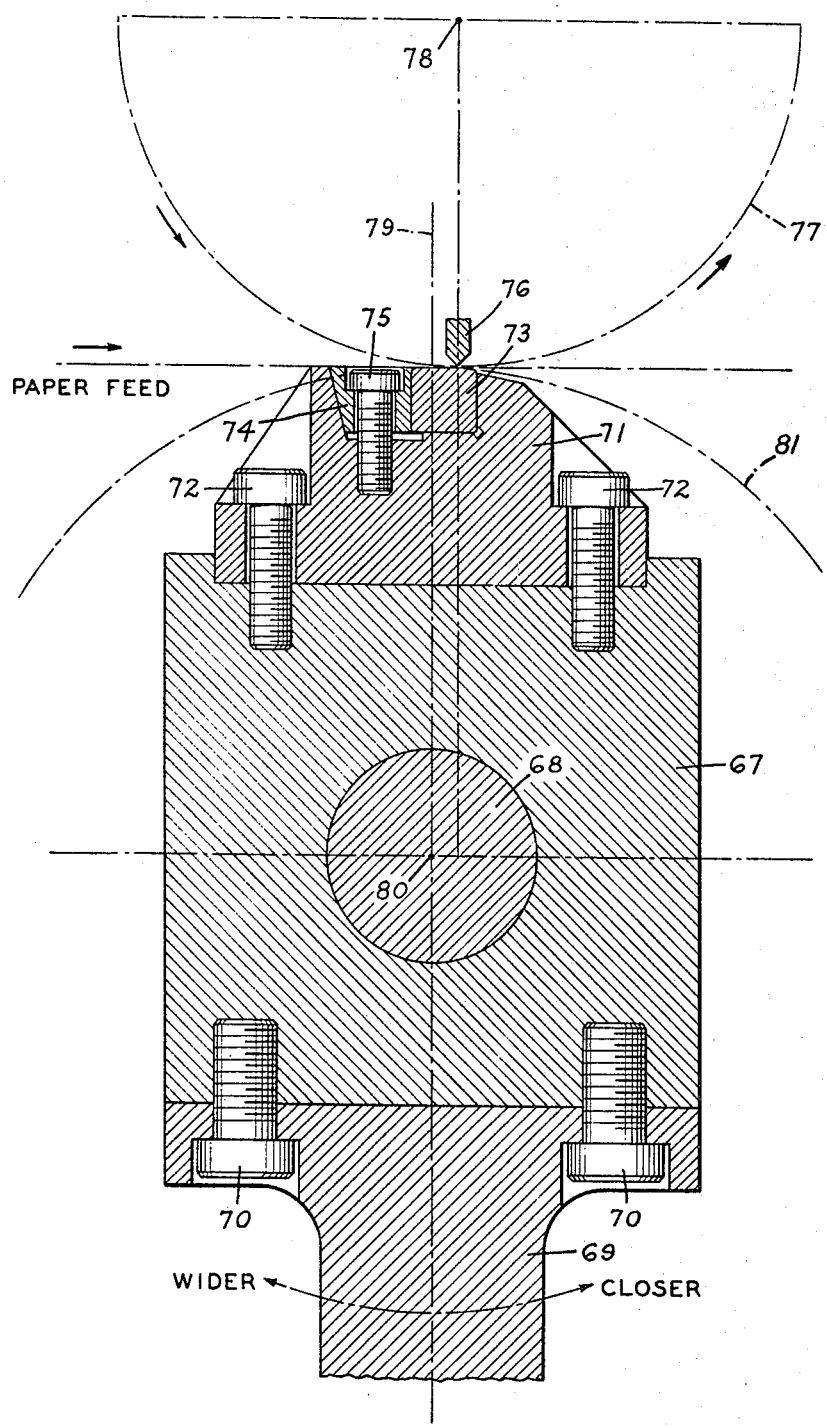

FIG. 9 is a section taken on line 9—9 of FIG. 8;

FIG. 10 is a section taken on line 10—10 of FIG. 8;

FIG. 11 shows the stationary counter surface of the cutting device on an enlarged scale;

FIG. 12 is an enlarged sectional view of a modification of the counter surface, and FIG. 13 is a view, in vertical section, of a portion of a modified form of counter member and adjustable carrying means therefor, and shows schematically the relationship thereof to the rotary cutter.

Referring first to FIGS. 1 and 2, the exemplified cutting device as shown in these figures comprises a cutting roller 3 rotatable on trunnions 4 and 5 journaled in frame walls 1 and 2. Suitable drive means, which may be visualized as being seated on or drivingly coupled to trunnion 4, rotates roller 3 at a uniform rate of speed in counterclockwise direction, as it is indicated by an arrow in FIG. 2. The cutting roller support four angular and arcuate cutting blades 6, 7, 8 and 9 (blade 8 being concealed but being similar to blade 9 shown in FIG. 2). Each of the cutting blades is mounted in a cylindrically curved bracket 6′, 7′, 8′ and 9′ respectively which are secured on the roller by suitable fastening means such as screws 11. The cutting blades and, more specifically, the blade edges are disposed on the roller so as to effect the cutting of corner notches 6″, 7″, 8″ and 9″ in an envelope blank 10. The cutting roller 3 further carries a suitably secured sleeve 12 which, in turn, supports an arcuate cutting blade 13 for cutting the rounded bottom flap 13′ of the envelope blank.

The cutting roller and, more specifically, the cutting blades supported thereon coact with a stationary counter or support tip 14. This tip, or at least the area thereof facing the blades on the cutting roller, is made of a suitable hard metal such as sintered tungsten carbide and is well polished. The effective area of the tip, that is the area directly facing and coacting with the edge blades which define an imaginary cylinder when roller 3 is rotating, may have a cylindrically curved configuration as it is shown in FIG. 11. The radius of curvature of tip 14 is preferably $R=1$ to 5 mm. For certain working materials and cutting conditions a substantially larger radius R may be advantageous, or even a tip 14a having a plane surface 66, as is indicated in FIG. 12.

Support or counter tip 14 is preferably secured to a mounting block 15 by soldering or other suitable means. The mounting block, together with tip 14, is attached by screws 16 or other fastening means to a carrier 17 pivotal about pins 18. Pins 18 are journaled in eccentric bushings 19 with as little play as practical. The bushings are rotatably supported in frame walls 1 and 2 and may be turned manually by any suitable means to vary the closeness of tip 14 to the path 65 of movement of the cutter blades carried by roller 3. The above-mentioned path 65 of the cutting edges of the cutter blades is shown schematically by the curved dot and dash lines in FIGS. 11 and 12. Carrier 17 is provided with a downwardly extending arm 20 which extends at its lower end between the two branches of a fork 22 secured to frame wall 2. Two oppositely disposed set screws 23 are threaded into the branches of the fork to adjust the angular position of arm 20 and with it of the position of tip 14 in reference to the cutting blades on roller 3. As it is evident, counter or support tip 14 and, more specifically, the effective area thereon is movable along a circular path about the axis of pivot 18 and can thus be adjusted closer to or more spaced from the circular or cylindrical path of movement of the edges of the cutting blades on roller 3. The aforedescribed pivoting of arm 20 serves to effect the fine adjustment of the cutting device in accordance with the gauge of the paper or other sheet material to be cut and can be carried out during operation. The coarse adjustment is made by rotating eccentric bushings 19 in the frame walls 1 and 2.

The blank or web 10 to be cut is guided and transported by suitable guide and transport means, shown in FIG. 2 as coacting rollers 39, 40 and 41, 42, the rollers 39 and 41 being driven by connections not shown in suitably timed relation to the rotary cutter 3, so that the sheet material to be cut is tangentially guided between roller 3 and counter or support tip 14. As it is evident, stationary tip 14 will firmly support the material to be cut when and while it is subjected to the action of the rotating cutting blades.

Instead of the triangular notches shown in FIG. 3, cut-outs 24 and 25 as shown in FIG. 7 may be made to produce blanks 26 for flat bags. To effect cut-outs of such configuration, it is merely necessary to provide appropriately shaped cutting blades on roller 3.

The several cutting blades may be fixedly mounted on a common cutting roller, or on several separate axially alined cutting rollers to facilitate production of profile cut blanks of any desired length.

The cutting device as hereinbefore described produces cut-outs in the peripheral outline of blanks or webs. FIGS. 4, 5 and 8 through 10 show an embodiment of a cutting device according to the invention for cutting out pieces of sheet material within a blank or web. FIG. 6 shows a blank 29 in which is cut a window 27′.

The cutting device for cutting out windows is similar in principle to the previously described cutting device, except that the cutting blades have a closed configuration the peripheral outline of which defines the window to be cut. A suitable cutting knife 27 is shown in FIGS. 4, 5 and 8. The cutting edge of this knife protrudes slightly from the circumferential wall of the cutting roller 3′, or as shown, from a separate mounting sleeve 30 suitably secured on the cutting roller. The protrusion of the blade edges is shown exaggerated in FIGS. 4, 5 and 8. As shown, the extent of protrusion of the cutting edge is the same at all points.

The stationary, polished hard counter tip 14 is mounted and pivotally arranged in the same manner as has been described in connection with FIGS. 1 and 2, that is, the effective area of tip 14 will again support the sheet material to be cut while the same passes between blade 27 and the effective area on tip 14.

Cutting roller 3′ is journaled in frame walls 1 and 2 (not shown in FIG. 8) by trunnions 4′ and 5′. A gear 43 is seated on trunnion 4′ and secured against rotation by a set screw 44. Gear 43 should be visualized as being drivingly coupled to a suitable drive means. The drive for the cutting device according to FIGS. 1 and 2 may be affected in a similar manner. Cutting roller 3′ and, more specifically, sleeve 30 thereon coacts with rollers 31, 35 and 37 which should be visualized as being driven in a similar manner in the directions indicated by the arrows in FIG. 4.

Within the outline defined by window cutting blade 27, there are provided ports 34 which are in registry with ports 61 extending into the roller 3′ and communicating with a lengthwise bore 60 in the body of the roller.

Control heads 45 and 46 respectively are provided at opposite ends of cutting roller 3′. The control heads are mounted on enlarged diameter portions 47 and 48, respectively, of the trunnions 4′ and 5′, each of said heads being secured by a ring 49 and a set screw 50 against lengthwise displacement. Each of the control heads has a radially protruding arm 51. An eye 52 in each of the arms should be visualized as being engaged by a suitable linkage system to prevent rotation of the control heads jointly with roller 3′ and to enable adjustment of the control heads into a predetermined angular position in relation to the rollers which advance the sheet material to be cut when the cutting device is started.

Control head 45 has a suction pipe 53 which should be visualized as leading to a suitable source of suction and which issues into an arcuate air duct 54. The control head is further provided with a pressure pipe 55 which should be visualized as leading to a suitable source of pressure air and which terminates in an arcuate duct 56 which is circumferentially shorter than duct 54.

Similarly, control head 46 has a suction pipe 57 which leads into an arcuate air duct 58 extending through about three quarters of the circumference. The remaining part of the circumference of the control head accommodates a transverse bore 59 through the entire thickness of the control head as can best be seen in FIG. 8.

In addition to lengthwise bore 60, the cutting roller 3' includes a second lengthwise bore 62 terminating in the end wall of the roller facing control head 46. Bore 62 communicates through bores 63 with ports 33 extending through sleeve 30.

Roller 31 (FIG. 4) has in its circumferential wall ducts 32 which should be visualized as communicating with a suitable source of suction. Similarly, roller 35 is provided with suction ducts 36 and roller 37 with suction ducts 38.

The operation of the cutting device as hereinbefore described, is as follows:

A blank 29 to be cut is fed to roller 31 by suitable guide and transport means, for instance of the kind shown in FIG. 2, but disposed adjacent roller 31, so that the tip 29' of the blank is attracted and retained by the suction in ducts 32. As the rotation of roller 31 continues, the blank is guided into the gap between roller 31 and cutting roller 3', or more specifically sleeve 30 thereof. Just as or before the tip 29' of the blank 29 reaches port 33, roller 3' will have been turned into an angular position in reference to the stationary control head 46 (see the arrow in FIG. 10) in which bore 62 and the leading end 58' of air duct 58 are in registry, whereby suction is generated in ports 33. Accordingly, the forward end or tip of the blank is gripped and retained at ports 33 and ducts 32 will release the blank due to the now stronger pull at ports 33. Ports 33 retain the blank until it enters into the gap between sleeve 30 and roller 37. Just before roller 3' and sleeve 30 reach the corresponding angular position, the connection between air duct 58 and bore 62 is cut off, but the prevailing vacuum in bore 62 is sufficient to retain the blank at ports 33 until it is taken over by the suction ducts 38 in roller 37. In this position bore 62 moves into registry with transverse bore 59 in control head 46 whereby bore 62 is connected to the atmosphere so that the vacuum in ports 33 collapses.

In the position of roller 3' as shown in FIG. 4 the cutting of the window just begins. Bore 60 in roller 3' is now in registry with the leading end 54' of duct 54 in control head 45 so that the vacuum generated in ports 34 attracts and retains the piece of paper which is cut out by window knife 27. The length of duct 54 is such that the duct ends just before the cut-out piece of paper retained by ports 34 enters into the gap between sleeve 30 and roller 35 which latter will now take over the cut-out piece of paper due to the pull of its suction ducts 36. At the same time, bore 60 moves into registry with the pressure duct 56 in control head 45. As a result the vacuum in ports 34 is changed to pressure whereby the cut-out piece of paper is blown against roller 35, thus assuring that it is taken over by this roller.

Turning now to the embodiment of the invention shown in FIG. 13, this includes a counter member carrier 67, somewhat similar to that shown at 17 in FIGS. 1 and 2 but of a different configuration. Carrier 67 is secured in any suitable way to a shaft 68, or the carrier may have a close sliding fit in relation to said shaft to adapt it to be turned in relation thereto. In lieu of providing a shaft extending throughout the length of carrier 67, the latter may be provided with trunnions or pins at its ends similar to those shown at 18 in FIG. 1. The shaft or trunnions or pins 68 may suitably be supported in eccentric bushings similar to those shown at 19 in FIG. 1, these bushings being turnable within the frame structure of the machine to enable slight adjustment of the position of the carrier 67 in relation to the rotary cutter. Carrier 67 extends longitudinally of the rotary cutter in the same manner as member 17 of FIG. 1. Secured to the bottom of carrier 67 is an arm 69, similar to the arm 20 of FIG. 1. Arm 69 is secured to the carrier 67 by screws 70. By means similar to those shown at 22 and 23 in FIG. 2, the position of arm 69 may be adjusted slightly to rock the carrier 67 about the axis of the shaft or trunnion 68, in either direction from the strictly vertical disposition shown in FIG. 13.

At the top of the carrier 67 the latter is provided with a longitudinally extending recess adapted to receive the bottom portion of a counter member holder 71. The latter is secured to the carrier by screws 72. In the top of holder 71 there is provided a longitudinally extending groove or recess adapted to receive a highly polished and hard surfaced counter member 73 of substantially square cross-section. The counter member is retained in the groove or recess by means of a clamping element 74 having its left surface (FIG. 13) sloped in the manner shown. It is secured to the holder 71 by means of a number of screws 75, only one of which is shown since the others are disposed in other areas lengthwise of element 74. These screws force the clamping element downwardly to a sufficient extent to firmly retain the counter member within the recess or groove mentioned.

There is schematically shown in cross-section a portion of a cutter element 76 which is carried by a rotary cylinder or roller to cause the cutting edge of element 76 to follow the circular or cylindrical path shown schematically at 77. This path has its rotational axis at the point indicated at 78. The overall arrangement is such that a vertical line extending downwardly from the axis 78 is spaced slightly, preferably to the extent of about 5 millimeters, from a vertical line 79 extending through the axis 80 of the shaft 68. This relative disposition of the axes 78 and 80 greatly facilitates the proper relative adjustment of the cylindrical path of movement of the cutting edges of the rotary cutters and the flat, normally horizontal top surface of the counter member 73. It will be appreciated that rocking of the carrier 67 about the axis of shaft 68, by adjustment of screws of the type shown at 23 in FIG. 2, will bring about tilting of the top surface of the counter member 73 from the strictly horizontal position shown, which is tangent to the cylindrical path 77 of the cutting edge of cutter 76 at the point where this is illustrated in FIG. 13. This plane of tangency may be referred to as the direction of "PAPER FEED" indicated in FIG. 13.

When the screws similar to those shown at 23 in FIG. 2 are adjusted to shift the lower end of the arm 69 toward the left, i.e., in the direction designated "WIDER" in FIG. 13, the top surface of the counter member 73 will be correspondingly tilted away from the direction of paper feed. On the other hand, when the adjustment is in the opposite direction, to swing the lower end of arm 69 toward the right in the direction designated "CLOSER," the top surface of the counter member will be inclined slightly upwardly toward the plane of paper feed and will place said surface somewhat closer to the path of the cutting edge of the cutter 76. The arc along which the counter member moves in the course of the adjustments mentioned is indicated by the line 81 having its center of curvature at 80. It will be understood that the extent of adjustment along the arc 81 is relatively small in one direction or the other from the position of the parts shown in FIG. 13.

While the invention has been described in detail with respect to certain now preferred examples and embodiments of the invention it will be understood by those skilled in the art after understanding the invention, that various changes and modificaions may be made without departing from the spirit and scope of the invention, and it is intended, therefore, to cover all such changes and modifications in the appended claims.

What is claimed is:

1. A cutting apparatus for cutting a profile in a continuously advancing sheet material moving through a definite path, with portions of the profile being cut in at least two substantially different angular relationships to the direction of movement of the material, said cutting apparatus including: means for advancing sheet material to be cut through a definite path, a cylinder having an axis of rotation and having a cylindrical surface disposed adjacent the material being advanced through said definite path, means providing a support for said cylinder and enabling its rotation about said axis, cutting means carried by said cylinder and having cutting edge portions extending outwardly from the surface of said cylinder, said cutting means having cutting edge portions extending along the surface of said cylinder at substantially different angular relationships to each other, all points on said cutting edge portions projecting from the surface of said cylinder to the same radial extent from the axis of rotation of said cylinder, a stationary rigid counter member disposed at the opposite side of the path of movement of the advancing sheet, said member having a hard and smooth surface extending transeversely of the direction of movement of the moving material and adapted to firmly hold successive small areas of the latter within the path of movement of said cutting edge portions, means for supporting the counter member and retaining it in predetermined fixed position, means for adjusting said supporting means to slightly vary the position of said counter member relative to the path of movement of the material and to vary the closeness of said hard and smooth surface of the counter member to the path of movement of said cutting edge portions of said cutting means, said adjusting means being adapted to fixedly position said area of the counter member in such close relation to the path of movement of said cutting edges as to insure the production of a profile cut in the advancing material, means connected with said rotating cylinder for providing suction to severed sections of said material for retaining the same on said cylinder as they are severed from the advancing material, and means connected with said cylinder for subsequently applying pressure to said sections to dispose of the same as they are carried into another position upon rotation of said cylinder.

2. A cutting apparatus for cutting a profile in a continuously advancing sheet material moving through a definite path, with portions of the profile being cut in at least two substantially different angular relationships to the direction of movement of the material, said cutting apparatus including: means for advancing sheet material to be cut through a definite path, a cylinder having an axis of rotation and having a cylindrical surface disposed adjacent the material being advanced through said definite path, means providing a support for said cylinder and enabling its rotation about said axis, cutting means carried by said cylinder and having cutting edge portions extenidng outwardly from the surface of said cylinder, said cutting means having cutting ege portions extending along the surface of said cylinder at substantially different angular relationships to each other, all points on said cutting edge portions projecting from the surface of said cylinder to the same radial extent from the axis of rotation of said cylinder, a stationary rigid counter member disposed at the opposite side of the path of movement of the advancing sheet, said member having a hard and smooth surface extending transversely of the direction of movement of the moving material and adapted to firmly hold successive small areas of the latter within the path of movement of said cutting edge portions, means for supporting the counter member and retaining it in predetermined fixed position, means for adjusting said supporting means to slightly vary the position of said counter member relative to the path of movement of the material and to vary the closeness of said hard and smooth surface of the counter member to the path of movement of said cutting edge portions of said cutting means, said adjusting means being adapted to fixedly position said area of the counter member in such close relation to the path of movement of said cutting edges as to insure the production of a profile cut in the advancing material, the hard and smooth surface of said counter member having a flat area adapted to cooperate with said cutting edge portions, said means for supporting said counter member and said means for adjusting the same being adapted to dispose said flat area of the counter member selectively either in a plane which is directly tangent to the path of movement of the cutting edge portions at their point of travel most closely adjacent to said counter member or in planes at a slight angle toward or away from said first mentioned plane in relation to the direction of movement of said cutting edge portions.

3. A cutting apparatus as set forth in claim 2 in which said counter member supporting means is rockable about an axis parallel with the axis of rotation of said cylinder, a vertical plane extending through the axis of rotation of said cylinder being spaced slightly from a vertical plane through the axis about which said counter member supporting means is rockably adjustable.

4. A cutting apparatus as set forth in claim 3 in which said vertical planes are spaced about 5 millimeters apart, said vertical plane through the axis of rotation of said cylinder being positioned forwardly from said other plane in relation to the direction of advance of said sheet material.

5. A cutting apparatus as set forth in claim 3 in which the effective cutting action of said cutting edges is about two millimeters of movement of the various portions of said cutting edges.

References Cited

UNITED STATES PATENTS

| | | | |
|---|---|---|---|
| 2,805,715 | 9/1957 | Novick | 83—349 X |
| 3,166,965 | 1/1965 | Stemmler | 83—349 X |
| 2,302,855 | 11/1942 | Hallman | 83—100 X |

FOREIGN PATENTS

| | | |
|---|---|---|
| 1,163,201 | 4/1958 | France. |

ANDREW R. JUHASZ, *Primary Examiner.*